Sept. 24, 1968  HIROSHI WATANABE ET AL  3,403,332
APPARATUS FOR MEASURING IMPEDANCE OF A SPECIMEN EMPLOYING
TWO OPPOSITE POLARITY CHARGED PARTICLE BEAM PROBES
Filed Sept. 22, 1965                                   2 Sheets-Sheet 1
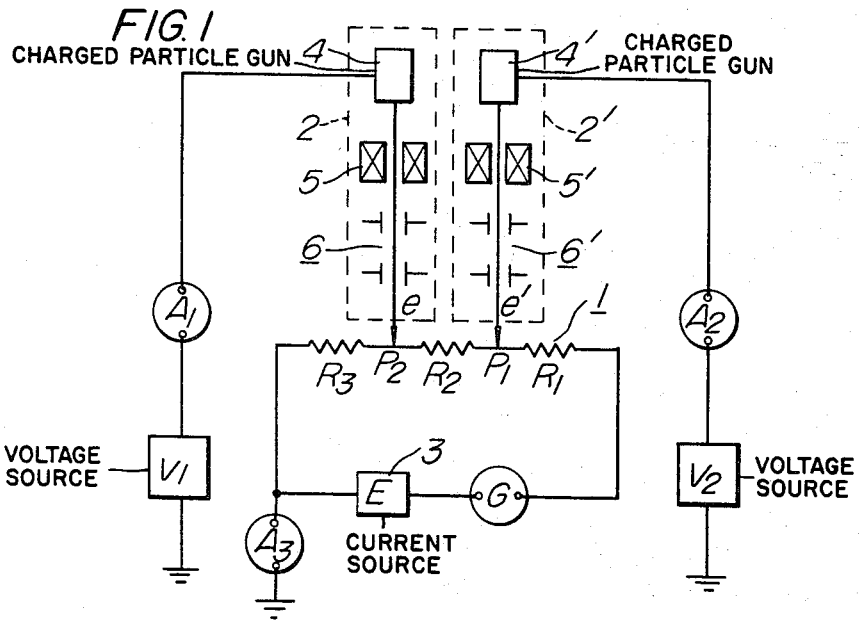
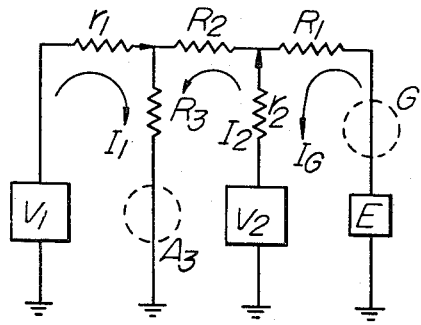
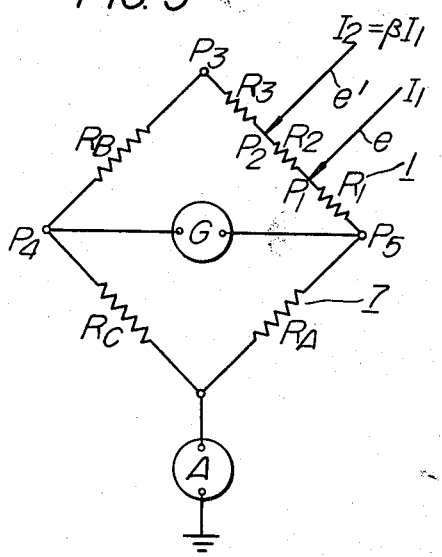
INVENTORS
HIROSHI WATANABE
CHUSUKE MUNAKATA
BY Paul M. Craig, Jr.
ATTORNEY

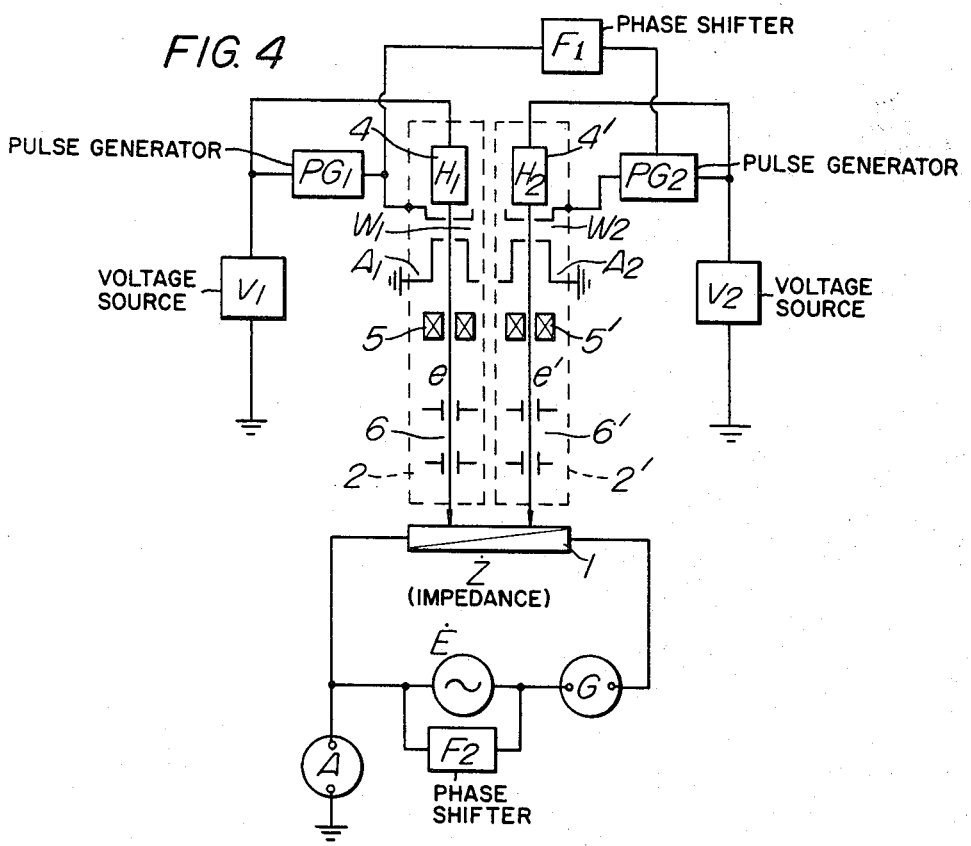
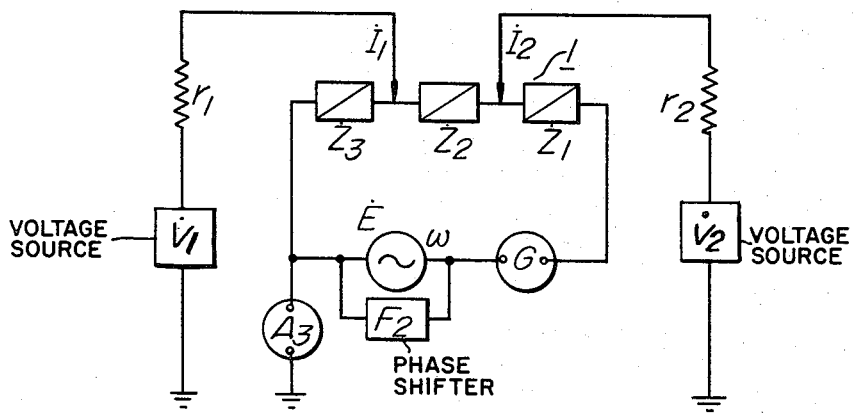

United States Patent Office 3,403,332
Patented Sept. 24, 1968

3,403,332
APPARATUS FOR MEASURING IMPEDANCE OF A SPECIMEN EMPLOYING TWO OPPOSITE POLARITY CHARGED PARTICLE BEAM PROBES
Hiroshi Watanabe and Chusuke Munakata, Kokubunji-shi, Japan, assignors to Hitachi Ltd., Tokyo, Japan, a corporation of Japan
Filed Sept. 22, 1965, Ser. No. 489,175
Claims priority, application Japan, Sept. 25, 1964, 39/54,331
8 Claims. (Cl. 324—57)

ABSTRACT OF THE DISCLOSURE

An apparatus for measuring the impedance of a specimen in which two charged particle beams of adjustable intensity and opposite polarity are directed to two predetermined points on the surface of the specimen. A variable DC current which is allowed to flow through the specimen is adjusted to zero, and at the same time, the intensities of the two charged particle beams are adjusted so that the currents due to the respective beams flowing between one end of the specimen and ground become equal to each other.

---

This invention relates to a novel system for measuring impedance of an electric conductor by the use of two charged particle beam probes.

Priorly known methods for measuring resistance between any two desired points on an ordinary electric conductor including a semiconductor, resistor or the like generally employ mechanical probes such as contactors and the like which are mechanically brought into contact with the conductor whose resistance is to be measured. In order to, however, measure resistance between two points on a very minute portion of these electric conductors according to the above-described prior methods, it has naturally been necessary to minimize a contact area of the probe and the prior methods utilizing such mechanical probes have largely been defective in this respect. Or more precisely, when such prior method is relied on, it is not an easy matter to reduce the contact area to less than 10 microns in diameter even with a probe having an extremely sharp point and the probe point when sharpened to an excessive degree would rather impart a mechanical injury to a portion of a conductor to be measured with the result that electrical properties of that portion of the conductor would be varied. Thus, according to the prior method, inconvenience has in many cases been encountered in practical measurement and reduction in the precision of measurement has generally been unavoidable.

In an effort to overcome the defects of the prior method as described above, the inventors already proposed in our U.S. patent application Ser. No. 323,489, now U.S. Patent No. 3,315,157, an improved method in which a very sharply converged electron beam was used as a probe in lieu of the mechanical probe as described above.

The above-described invention still has some points which are to be technically improved as described below because, in the patented invention, the probe is limited solely to an electron beam and a single electron beam is exclusively used.

(1) When a single beam is used, only the resistance or impedance can be measured that is between one end of a specimen and a point of beam bombardment, and hence it is impossible to measure resistance or impedance between any two desired points on the specimen at a time.

(2) With the use of the electron beam alone, the electron beam may possibly ionize gas molecules remaining in the column or specimen chamber and ions thus formed may adversely affect the electron beam probe.

(3) A film resulting from the so-called contamination deposits at a point of electron beam bombardment on the specimen.

(4) There is a relatively great secondary electron yield, that is, a relatively great error is caused by the flow of secondary electrons into other portions due to irradiation by the electron beam.

Having the above difficulties inherent in the preceding patented invention in view, it is the primary object of the present invention to provide an improved impedance measuring system in which an arrangement is made so that a plurality of charged particle beams are directed towards a specimen and resistance or impedance between any desired points on the specimen is measured on the basis of the relation between the radiated beam currents and the voltage-current characteristics of a circuit including the specimen and so that the above-described difficulties can thereby completely be eliminated.

According to the present invention, there is provided a system for measuring the impedance of an electric conductor by probes in the form of charged particle beams comprising means for radiating a plurality of charged particle beams, means for periodically varying the intensity of said beams, means for accelerating and focusing said beams, means for deflecting said beams to direct said beams towards any desired points on said conductor, means for measuring the radiated beam currents and the voltage-current characteristics of a circuit including said conductor, and means for obtaining the impedance value between the points of beam bombardment on said conductor from said voltage-current characteristics.

According to the present invention, there is also provided a system for measuring the impedance of an electric conductor by probes in the form of charged particle beams comprising means for radiating a plurality of charged particle beams, means for periodically varying the intensity of said beams, means for accelerating and focusing said beams, means for deflecting said beams to direct said beams towards any desired points on said conductor, a bridge circuit including said conductor as one of its arms, means for detecting a voltage generated across one pair of opposed terminals of said bridge circuit by the radiated beam currents, means for balancing said bridge so that this detected voltage is rendered zero, and means for obtaining the impedance value between the points of beam bombardment on said conductor from this balanced relation of said bridge.

The above and other objects, advantages and features of the present invention will become obvious from the following description with reference to the accompanying drawings, in which:

FIG. 1 is a diagrammatic view showing an arrangement employed in one embodiment of the present invention;

FIG. 2 is an equivalent circuit diagram of FIG. 1;

FIG. 3 is a schematic diagram showing parts of another embodiment according to the present invention;

FIG. 4 is a diagrammatic view showing an arrangement employed in still another embodiment of the present invention; and FIG. 5 is an equivalent circuit diagram of FIG. 4.

Referring first to FIG. 1, a specimen whose resistance between any desired points thereon is to be measured is designated by reference numeral 1. The system according to the present invention, as shown in FIG. 1, includes charged particle beam generators 2 and 2', a galvanometer G for detecting the current flowing through a circuit including the specimen 1, ammeters $A_1$ and $A_2$ for measuring the radiated beam currents, an ammeter $A_3$ for measuring the current flowing into the specimen 1 as a result of the impinging beams, and a source of power supply 3 for the above circuit. The respective charged particle beam generators 2 and 2′ for generating sharply converged charged particle beams $e$ and $e'$ are composed of charged particle guns 4 and 4′, condenser lenses 5 and 5′, beam deflectors 6 and 6′ each consisting of two sets of deflector plates disposed at right angles relative to each other, power sources $V_1$ and $V_2$ for beam acceleration, and so on. Since, with such arrangement, the diameter of a spot irradiated by the charged particle beam can very easily be made smaller than a value of the order of 10 microns, this charged particle beam can function as a probe having a very small contact area.

Suppose now that the respective charged particle beams $e$ and $e'$ are made to irradiate two optionally selected points $P_1$ and $P_2$ on the above-described specimen 1 and voltage E of the power source 3 is suitably regulated so that zero swing is seen on the galvanometer G when $E=E_0$, $E_0$ being the voltage drop between the points of beam irradiation on the specimen. Then, the following relation exists among the voltage $E_0$, radiated beam currents $I_1$ and $I_2$, and resistances $R_1$, $R_2$ and $R_3$ of the respective sections on the specimen 1 as will be apparent from the equivalent circuit shown in FIG. 2, in which $r_1$ and $r_2$ represent equivalent resistances of the respective beams.

$$I_1R_3+I_2(R_2+R_3)=E_0 \tag{1}$$

Therefore by arranging in a manner that $I_1$ has a polarity opposite to that of $I_2$, that is, the charged particle beam $e_1$ has a polarity opposite to that of the charged particle beam $e_2$ and $/I_1/=/I_2/$ (this being easily detectable because this corresponds to zero current on the ammeter $A_3$), the above Equation 1 can be expressed as $$\pm/I_1/R_3 \mp /I_2/(R_2+R_3)=\pm/I_2/R_2$$
$$=\pm/E_0/ \tag{2}$$

Hence, $$R_2=\frac{/E_0/}{/I_2/} \tag{3}$$

It will thus be known that the resistance between the points of beam bombardment can directly be measured at a time and, by knowing a distance between the points, it is possible to calculate the resistivity of this specific section of the specimen.

FIG. 3 shows another embodiment according to the present invention in which resistance of any optionally selected section on a specimen 1 is measured by a D.C. bridge circuit including the specimen 1 as one of its arms. In FIG. 3, $R_A$, $R_B$ $R_C$ are resistances having known values and G designates a galvanometer for detecting the balance of the bridge. Suppose $I_1$ and $I_2$ ($I_2=\beta I_1$) represent respective beam currents at points of beam bombardment $P_1$ and $P_2$ on the specimen 1, and $R_1$, $R_2$ and $R_3$ represent respective resistances between points $P_5$ and $P_1$, $P_1$ and $P_2$, and $P_2$ and $P_3$. Then, unbalanced voltages $Vg_1$ and $Vg_2$ generated between a pair of opposed terminals $P_4$ and $P_5$ in the bridge by these currents are expressed by the following equations:

$$Vg_1=\frac{I_1\{R_CR_1-R_A(R_B+R_2+R_3)\}}{R_A+R_B+R_C+X} \tag{4}$$

$$Vg_2=\frac{I_2\{R_C(R_1+R_2)-R_A(R_B+R_3)\}}{R_A+R_B+R_C+X} \tag{5}$$

where, $X=R_1+R_2+R_3$

Assume now that $\beta=0$, then $Vg_1=0$ is the condition that is required to attain the balance of the bridge. In this case, the values $R_{B1}$ of resistance $R_B$ is $$R_{B1}=\frac{R_CR_1-R_A(R_2+R_3)}{R_A} \tag{5)'}$$

Therefore, $$R_1=\frac{R_{B1}+X}{1+\dfrac{R_C}{R_A}} \tag{6}$$

In case $\beta \neq 0$, that is, the two beams $e$ and $e'$ are made to simultaneously irradiate the respective points $P_1$ and $P_2$, the condition required for the balance of the bridge is $Vg_1+Vg_2=0$. In this case, the value $R_{B2}$ of resistance $R_B$ is $$R_{B2}=\frac{R_C\{(1+\beta)R_1+\beta R_2\}-R_A\{R_2+(1+\beta)R_3\}}{(1+\beta)R_A} \tag{7}$$

Thus, an increment $\Delta R_1$ of resistance $R_1$ relative to an increment $\Delta R_B$ of resistance $R_B$ shown by the equation $\Delta R_B=R_{B2}-R_{B1}$ is $$\Delta R_1=\frac{R_A \Delta R_B}{R_A+R_C}=\frac{\beta R_2}{1+\beta} \tag{8}$$

Therefore, when the two charged particle beams are simultaneously used to irradiate the specimen and the bridge is brought to balance under this state, measured resistance R′ corresponding to the resistance in the Equation 6 is expressed as $$R'=\frac{R_B+X}{1+\dfrac{R_C}{R_A}} \tag{9}$$

and the relation among R′, $R_1$, $R_2$ and $\beta$ is given by $$R'-R_1=\frac{\beta R_2}{1+\beta} \tag{10}$$

Thus, the following calculation can be made:

(1) If $\beta=0$, that is, $I_2=0$, then $R'=R_1$. In this case, the value of $R_1$ can be measured.

(2) If $\beta=\infty$, that is, $I_1=0$, then $R'=R_1+R_2$. In this case, the value of $R_1+R_2$ can be measured.

(3) If $\beta \neq 0$, the following equation can be obtained from the above Equation 10.

$$R_2=(R'-R_1)\frac{1+\beta}{\beta} \tag{11}$$

In this case, the value of $R_2$ can be measured by finding the value of $R_1$ beforehand.

In any of the above embodiments, description has been given with regard to a case of resistance measurement by means of charged particle beams. However, by varying intensity of this beam periodically and by employing means such as a suitable A.C. bridge, it becomes possible to take measurement of impedance other than resistance. Whether a continuous or a discontinuous beam is used in an ordinary bridge is dependent upon the nature of a power supply therefor, D.C. or A.C.; and therefore there is no appreciable difference in the principle of methods for measurement. It is true that, when measurement of a resistance is solely desired, a D.C. bridge system cooperating with a continuous beam may exclusively be used but thermoelectromotive force involved in the case of D.C. may bring forth a somewhat increased error. The abovedescribed A.C. bridge system is preferred in this respect since the influence of thermoelectromotive force as described above can be eliminated by the use of the A.C. bridge system.

An embodiment shown in FIG. 4 is an improvement of the system of FIG. 1 so that this system can be used for the measurement of impedance as above-mentioned. The system of FIG. 4 differs from that of FIG. 1, in that it is equipped with phase shifters $F_1$ and $F_2$ and pulse generators $PG_1$ and $PG_2$. In this system, respective pulsed outputs of the pulse generators $PG_1$ and $PG_2$ are applied to beam modulation grids $W_1$ and $W_2$ to vary intensity of charged particle beams $e$ and $e'$ emitted from charged particle guns $H_1$ and $H_2$ periodically.

Assume that periodically modulated beam currents $I_1$ and $\dot{I}_2$ have the same frequency, respective phase differences of $\dot{I}_2$ and $\dot{E}_0$ with respect to $\dot{I}_1$ are $\varphi_2$ and $\varphi_0$, and respective impedances $\dot{Z}_1$, $\dot{Z}_2$ and $\dot{Z}_3$ at points of beam bombardment on a specimen 1 have phase angles of $\theta_1$, $\theta_2$ and $\theta_3$. Then, as will be apparent from FIG. 5, the Equation 1 can now be expressed as $$I_1 e^{j\omega} \dot{Z}_3 + I_2 e^{j(\omega t + \varphi_2)} (\dot{Z}_2 + \dot{Z}_3) = E_0 e^{j(\omega t + \varphi_0)} \quad (12)$$

$$I_1 \dot{Z}_3 + I_2 (\dot{Z}_2 + \dot{Z}_3) e^{j\varphi_2} = E_0 e^{j\varphi_0} \quad (13)$$

where, $j = \sqrt{-1}$, $\omega = 2\pi f$, $e$ is the base of natural logarithm $\dot{E}_1$, $\dot{I}_2$, etc. represent complex indications of current, and $I_1$, $I_2$, etc. represent their absolute values.

Suppose now $I_1$ and $I_2$ have the same polarity and the phase shifter $F_1$ is suitably regulated to give a relation $\varphi_2 = \pi$, then $e^{j\pi} = -1$, and $$I_1 \dot{Z}_3 - I_2 (\dot{Z}_2 + \dot{Z}_3) = E_0 e^{j\varphi_0} \quad (14)$$

Therefore, $I_1 = I_2$ gives a condition which is equivalent to the previous Equation 2.

$$\dot{Z}_2 = Z_2 e^{j\theta_2} = \frac{E_0}{I_1} e^{j\varphi_0} = \frac{E_0}{I_2} e^{j\varphi_0} \quad (15)$$

Thus, the absolute value of impedance $\dot{Z}_2$ between the points of beam bombardment and its phase angle $\theta_2$ can be obtained at a time from $E_0/I_2$ and from $\varphi_0$ (known from the indication of the phase shifter $F_2$), respectively.

From the foregoing description, it will be appreciated that the present invention is advantageous in that resistance or impedance between points of beam bombardment cen be measured at a time. Another advantage derivable from the invention is that, by use of charged particles in the form of suitable ions, any objectionable effect on the beam probe can be minimized because an ion is least probable to ionize the gas molecules in the specimen chamber and thus particles having a polarity different from that of the ion beam are rarely formed. An additional advantage derivable from the use of the ion beam is the possibility of reduction in a measurement error due to secondary emission since the secondary electron yield in the case of the ion beam is generally less than in other cases. Moreover, generation of contamination is reduced to a substantial degree with the ion beam.

Further, suppose the values of $I_1$, $R_1$ and $R_2$ are known in the circuit of FIG. 3, then it is possible to seek the value of $\beta$ from an equation $$\beta = \frac{R' - R_1}{\{R_2 - (R' - R_1)\}} \quad (16)$$

and it is possible to measure $I_2$ since $I_2 = \beta I_1$. In this case, it is a quite easy matter to have a $\beta$ detection sensitivity of the order of $10^{-3}$ to $10^{-4}$. The detection circuit for a very small current thus formed has a remarkable effect for practical application in that it is used not only for measurement of impedance but also for measurement of electrical characteristics on the basis of the measured impedance value.

What is claimed is:

1. An apparatus for measuring the impedance of a specimen comprising: generator means for forming and directing two charged particle beams of opposite polarity to two predetermined points on the surface of the specimen, a selectively variable current source connected to the specimen for passing a current therethrough, first measuring means connected between said current source and said specimen for measuring the current flowing through the specimen, second measuring means, one end of which is connected with one end terminal of the specimen and the other end of which is connected with said generator means, for measuring the difference of the two currents through the specimen due to the respective charged particle beams, third measuring means connected to said generator means for measuring the two individual currents of the respective charged particle beams and adjusting means for adjusting the intensities of the charged particle beams so that the two currents of the respective beams become equal to each other.

2. An apparatus according to claim 1, wherein said adjusting means includes means for periodically varying the intensities of the two charged particle beams and a phase shifter for adjustng the phase of the adjustable current relatve to those of the beams.

3. An apparatus for measuring the impedance of a specimen comprising: generator means for generating two charged particle beams including means for accelerating and focusing each beam, means for deflecting each beam to direct it to respective predetermined points on the specimen and means for interrupting the generation of either one of the two beams, a bridge circuit including four impedance arms, one of which arms is the specimen and another of which arms is a variable impedance for balancing the bridge circuit, and means for detecting the impedance of the same arm of the balanced bridge circuit.

4. An apparatus according to claim 3, further including means for periodically varying the intensities of the two charged particle beams.

5. An apparatus for measuring the impedance of a specimen comprising: first and second generator means for forming and directing respective charged particle beams of opposite polarity to two predetermined points on the surface of the specimen, a selectively variable current source and a galvanometer connected in series across said specimen, first and second selectively variable voltage sources having one side connected respectively to said first and second generator means to control the beam current, a first current detector connected between one side of said specimen and the other side of said first and second selectively variable voltage sources, and second and third current detectors connected in series with said first and second selectively variable voltage sources, respectively.

6. An apparatus according to claim 5, wherein said first and second generator means each include means for periodically varying the intensities of the two charged particle beams and wherein said current source includes an alternating current source and a first phase shifter connected thereto for adjusting the phase of the current provided thereby with respect to the beam currents.

7. An apparatus according to claim 6 wherein said first and second generator means are connected to a second phase shifter for adjusting the phase of the two beam currents.

8. An apparatus for measuring the impedance of a specimen comprising: first and second generator means for forming and directing respective charged particle beams to two predetermined points on the surface of the specimen each including means for selectively interrupting the generation of the particle beam, a bridge circuit including four impedance arms, one impedance arm being the specimen and another impedance arm being a variable impedance for balancing the bridge circuit, a galvanometer connected to one end of said specimen across said bridge circuit and a current detector connected between said bridge circuit and said first and second generator means to determine the current provided to said specimen by said generator means.

References Cited

UNITED STATES PATENTS

| | | | |
|---|---|---|---|
| 2,507,590 | 5/1950 | Clark | 324—62 XR |
| 3,054,896 | 9/1962 | Jones et al. | 250—41.9 |
| 3,315,157 | 4/1967 | Watanabe et al. | 324—62 |

RUDOLPH V. ROLINEC, *Primary Examiner.*

E. E. KUBASIEWICZ, *Assistant Examiner.*